United States Patent [19]

Gardeen

[11] Patent Number: 4,705,456
[45] Date of Patent: Nov. 10, 1987

[54] CONTROL PANEL STRUCTURE FOR A LIQUID PUMPING STATION

[75] Inventor: John A. Gardeen, St. Paul, Minn.

[73] Assignee: Consolidated Electric Co., St. Paul, Minn.

[21] Appl. No.: 894,624

[22] Filed: Aug. 8, 1986

[51] Int. Cl.[4] .................. F04B 49/02; F04B 49/06
[52] U.S. Cl. ............................... 417/7; 417/63; 137/392
[58] Field of Search ........................... 417/5–8, 417/63; 137/392; 340/618, 286 M, 624, 524, 525; 73/304 R

[56] References Cited

U.S. PATENT DOCUMENTS

| | | | |
|---|---|---|---|
| 3,390,411 | 1/1976 | Beeker | 73/223 |
| 3,598,144 | 8/1971 | Hodgson | 137/392 |
| 3,624,648 | 11/1971 | Willoughby | 340/286 M |
| 3,947,692 | 3/1976 | Payne | 250/577 |
| 3,973,437 | 8/1976 | Yanagihara | 73/219 |
| 4,127,030 | 11/1978 | Martig, Jr. | 73/194 |
| 4,297,081 | 10/1981 | Irvin | 417/2 |
| 4,353,118 | 10/1982 | Heimgartner | 364/510 |
| 4,380,933 | 4/1983 | Irvin | 73/749 |
| 4,395,918 | 8/1983 | Wilson | 73/861 |
| 4,444,545 | 4/1984 | Sanders | 417/8 |
| 4,456,432 | 6/1968 | Mannino | 417/2 |
| 4,461,175 | 9/1980 | Baumgart | 340/618 |
| 4,551,068 | 11/1985 | Boudreaux | 417/36 |
| 4,555,694 | 11/1985 | Yanagishima | 340/286 M |
| 4,637,424 | 1/1987 | Morgan | 137/392 |

FOREIGN PATENT DOCUMENTS 1151297 2/1983 Canada ............................. 354/31

*Primary Examiner*—William L. Freeh
*Attorney, Agent, or Firm*—Leo Gregory

[57] ABSTRACT

An easily viewed control panel structure indicating the status of and controlling the operation of a water, wastewater or process liquid pumping station where the pumping equipment is operated automatically with respect to a varying liquid level or pressure, liquid level is sensed over a calibrated range, the sensed level information is sent to a controller as a proportional signal, the value of the level of pressure information is displayed on a multi-element, vertically-oriented light-emitting diode bar graph display with each element representing a uniform increment of the total level or pressure range, a circuit-connecting programming pin is inserted in each of several vertically positioned receptacles of the control panel with each such insertion at each horizontal level representing a segment of the level display bar graph, with each receptacle representing a turn-ON or turn-OFF capability of the controller and with two such receptacle circuits combining to provide differential level automatic control of a pump or alarm circuit, an automatic arrangement transposes the starting sequence of multiple pumps or successive operations, a level simulation switch provides a false rising or lowering level for test purposes, and an audible alarm and visual signal alerts an operator to the occurrence of an abnormal level condition.

3 Claims, 2 Drawing Figures

CONTROL PANEL STRUCTURE FOR A LIQUID PUMPING STATION

BACKGROUND OF THE INVENTION

1. Field of the Invention.

This invention relates to a control panel for a liquid pumping station.

2. Description of the Prior Art.

In municipal sewage collection and disposal systems, waste waters are caused to flow by gravity into accumulator or collection sumps and pumps are provided to prevent the collection of waste waters from exceeding practical levels, the pumps moving the collected waste waters to a disposal system.

Collection system pumping stations generally embody the use of at least two pumps for safe operating purposes. Most such systems operate under the pump-down method wherein when the accumulation of sewage laden liquid or waste water reaches a pre-set upper limit in a sump, a pump automatically becomes turned on until the level of liquid is reduced to a predetermined pumped down level at which point the pump is automatically turned off. The pumps are generally arranged to operate alternately. It is often desirable to have an alarm sensor indicate that an abnormally high level has been reached exceeding the predetermined pump control limit and indicating the failure of a pump to operate even though the second pump in the system is activated.

In the operation of pumping stations, it is desirable for the operator to be able to readily view the liquid or waste water levels and the operating status of the pumps.

A set of level sensing float type switches which embody light emitting diodes (LEDS) on a control panel are often used which give an idea of the liquid level but such a reading is not a precise reading. An air purge "bubbler" level response system is often used to show the level and provide control but this is subject to clogging and is mechanically complex resulting in a lack of reliability.

In general, the sewage pumping station collection sump and its control panel can not be easily viewed without the need to open a hatch door, raising a heavy lid and the like.

The arrangement to easily permit viewing the liquid level of a sump from a control panel as well as checking the operation of the pumps would be a very desirable improvement.

SUMMARY OF THE INVENTION

The invention herein provides an elevated panel which is convenient to observe and which provides the essential information to be known about the liquid levels in the collection sumps and the operation of the pumps.

Further, it is an object of the invention herein to automatically operate a level responsive pump station in a desired sequence of operation of the pumps and have the pumps respond to a liquid level sensing device and having a display of the depth of liquid in a sump.

The invention also has for an object to provide a bright display panel showing the level of a liquid in a sump and to embody a plurality of programming circuit contact points giving independent parameters for automatic pump operation and liquid level alarms with all the programing set points being readily visible and reachable.

For a further object, the invention embodies a switching arrangement which permits the operator to simulate a rising or lowering level of liquid with its attendant effect on control and alarm circuits to safely test the operation of the pumps.

This invention also has for an object to provide for an automatic alternation of pump activity in the event the pumping is required to override a rising level.

It is also an object to embody in the invention herein, that in the event of a power failure pumping action will not commence immediately upon the restoration of power but rather a power-on delay prevents the pumps from coming on until after a predetermined delay to protect the installation from a sudden surge of power. Further delay is embodied in the system to prevent, in a two pump system, the simultaneous start up of both pumps.

These and other objects and advantages of the invention will be set forth in the following description made in connection with the accompanying drawings in which like reference characters refer to similar parts throughout the several views.

DESCRIPTION OF A PREFERRED EMBODIMENT

Figure 1:
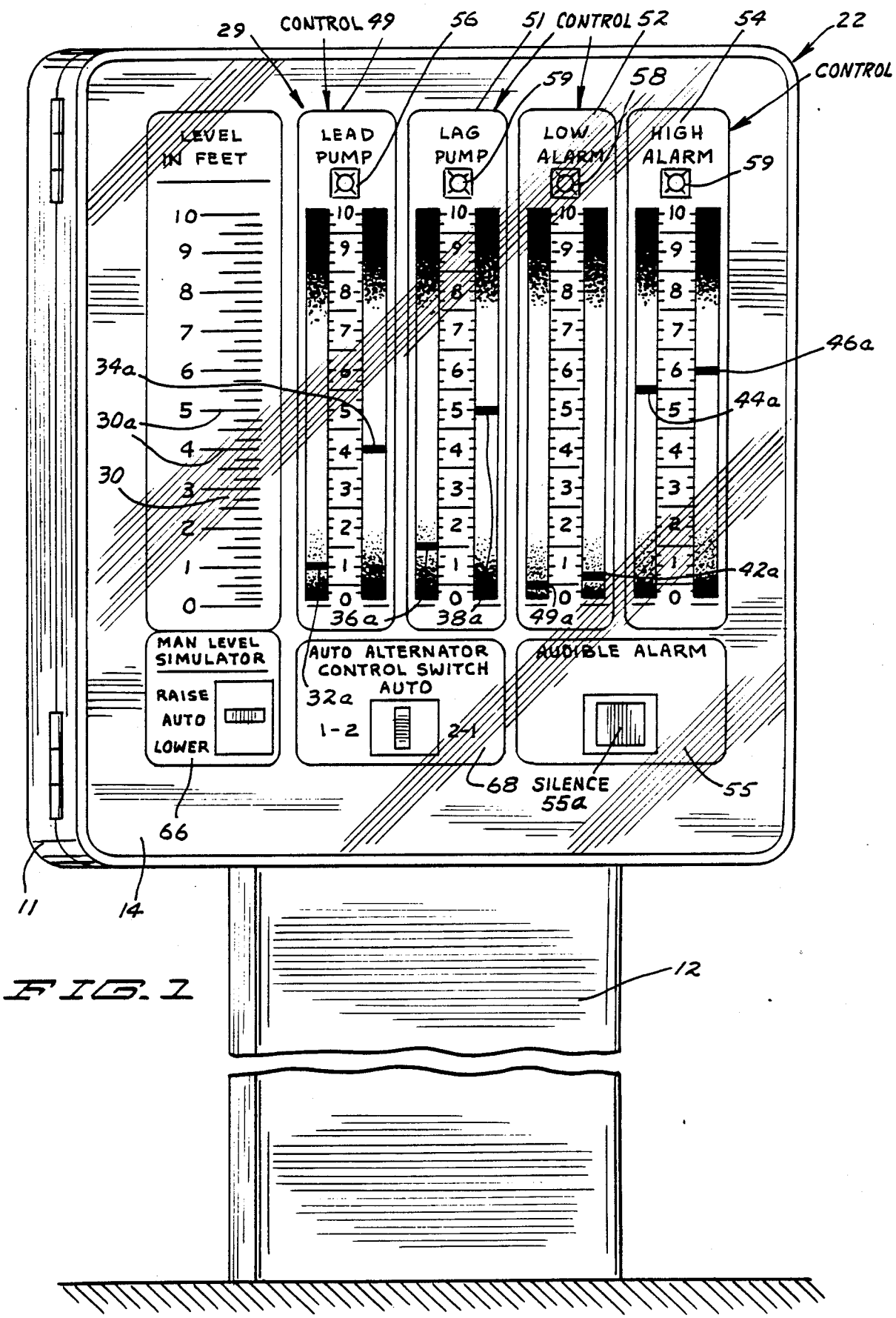
FIG. 1 is a view in elevation of the control panel herein.

Referring to the drawings, the structure 10 herein relates to a control panel structure and monitor to control a pumping operation which may be used in connection with sewage lift stations, water systems and various process liquid pumping stations. For purposes herein, reference will be had to said control panels in connection with a sewage lift or pumping station.

The invention herein is present in the unique and novel arrangement of the control panel 22, as will be described.

Said control panel is in operative association by a cable 28 with a submersible transducer 24 which senses the pressure caused by the height of the liquid in the sewage collection sump 26.

A housing 11 is indicated containing said panel and although it is here shown being supported upon a pedestal 12, it may be wall mounted or otherwise supported. Said housing is shown provided with a transparent hinged cover 14.

The housing 11 at the rear of said panel 22 will contain the circuitry for operation of said panel and for its connection with the transducer 24 and for which the connecting cable 28 is shown. The circuitry herein is conventional and it is known in the art how to provide the appropriate wiring arrangement to operate the panel and to connect the panel and said transducer to carry out the several functions of the operative association therebetween as hereinafter described.

A suitable current power source is indicated at 87 and the same is suitably converted for use herein as indicated at 88. The present arrangement, as a preliminary statement, is for an automatic operation of pumps, alarms and related equipment in an ON-OFF differential level mode displayed on said panel and operating in response to excursions of an analog signal and providing a multiplicity of signal-increment lines 31 in connection with said control panel display and its circuitry which lines are energized progressively or regressively in response to increases or decreases in the analog value of each signal received. Each signal-increment line represents an increment of the analog signal and display range. Said lines are contiguous in operation and together represent the entire analog signal excursion. Conventional plug-in switch or contact elements (hereinafter referred to as contact elements) selectively connect the signal-increment lines to be in circuit with control columns to be described.

Figure 2:
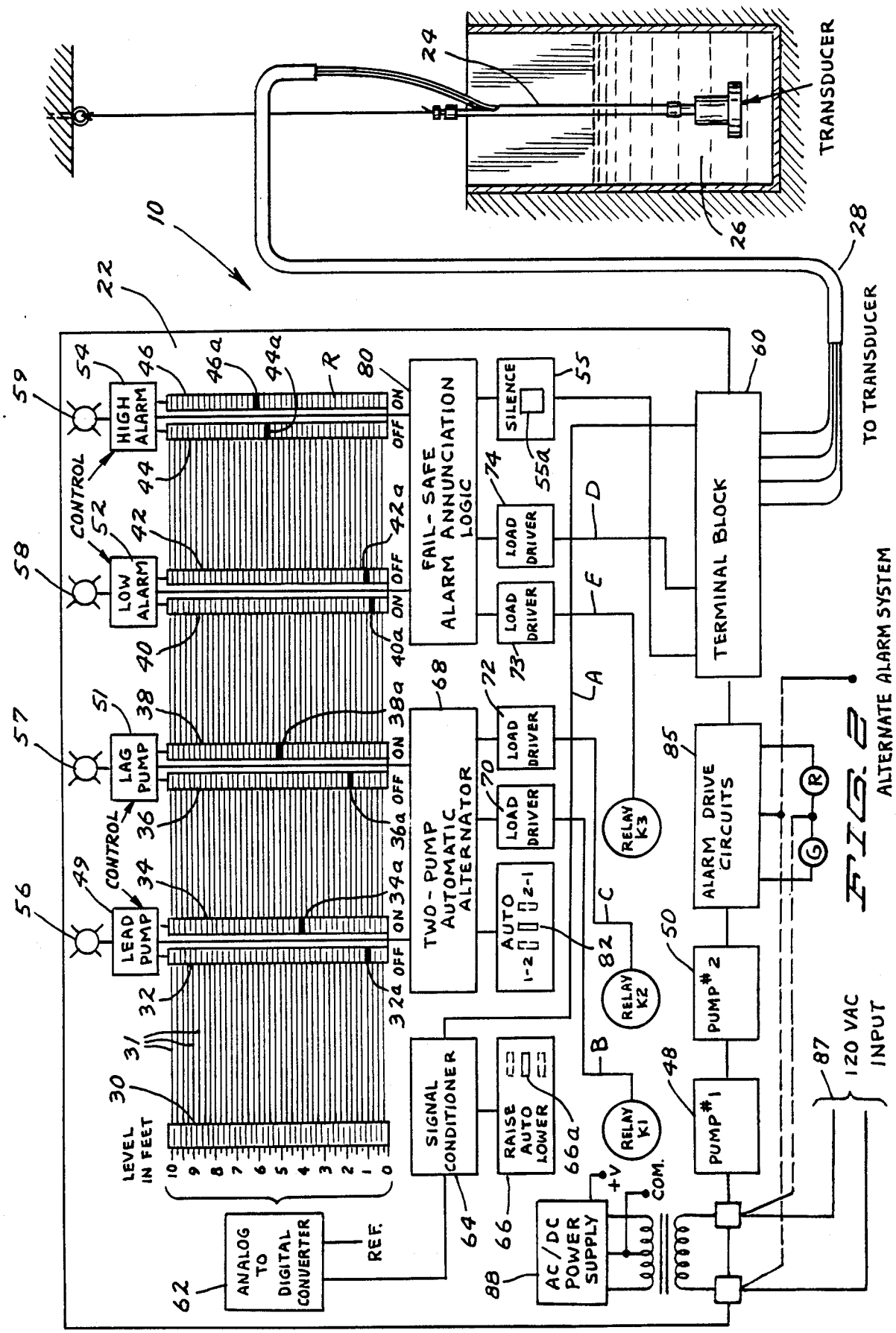
FIG. 2 is a diagrammatic showing of the control panel herein coupled with a block diagram of electronic and mechanical components and coupled with a schematic showing of a submersible water level transducer.

Pumps 1 and 2 as indicated as 48 and 50 in FIG. 2 are operated when the sensed analog signal increases or decreases to the selected ON increment line and are turned off when the analog signal changes and the selected OFF signal-increment line is activated or deactivated as the case may be. In like manner, alarms are energized and de-energized. Further description is hereinafter given.

Referring now to the panel 22, this panel responds to a wet well level proportional electronic signal from said transducer 24 which is indicated here as being a prior art solid state type of transducer.

The control panel, as here illustrated, is calibrated to be used in connection with a scale 30 of 0-10 foot water depth range. Also carried by said panel are, as shown, four pairs of similarly obtained vertical control columns 32-34, 36-38, 40-42 and 44-46 of rows of programming contact element receptacles R. Said columns act as controls in accordance with the positioning of said contact elements in the receptacles of said columns and noted at the bottom of each pair of said columns are the legends "OFF-ON" or "ON-OFF" contacts, as the case may be, for setting the liquid levels for the automatic operation of said pumps 48 and 50, and for the operation of a low level alarm 52 and a high level alarm 54. The contact elements plugged into said receptacles are indicated as 32a-34a, 36a-38a, 40a-42a and 44a-46a.

Said contact elements upon being inserted in operating position form completed circuits and determine at which horizontal signal-increment line each circuit is energized.

The contact elements operate in pairs to provide a full range of independent adjustability of ON and OFF control elevations and independent differential level controls is thus provided for each of the pumps and level alarms indicated.

At the upper end of each pair of said columnar receptacles is an LED, indicated here as 56-59, the LED becoming energized when its differential control circuits is ON and becomes de-energized when that circuit is OFF.

The respective pairs of columnar receptacles 32-34, 36-38, 40-42 and 44-46 are referred to as differential control elements 49, 51, 52 and 54 bearing for reference the indicia Lead Pump, Lag Pump, Low Alarm and High Alarm.

Said differential control elements are ON/OFF latching types in that they are turned ON when their respective turn ON vertically arranged receptacle row is activated by the excursion of the analog signals to a particular elevation as such excursion produces an energized condition in the signal increment line 31 where the contact element 34a, (for example), is inserted. When the resulting operation of the controlled pump 48, (for example), results in a lowering of the sensed level to a pre-set level, the level display 30 and the signal-increment lines 31 will be de-energized to a lower horizontal level until the turn OFF contact element 32a is reached and will be activated and cause the differential control element 49 to be de-energized, thus turning off the LED 56, relay K1 and with the related circuitry, the pump 48.

Intermediate the line A from the Terminal Block 60 to the analog Digital Converter 62 is a signal conditioner 64 having in connection therewith a test level indicator 66 which embodies a 3-position switch 66a which permits an operator to simulate a rising or lowering liquid level to test the pump operation and alarm circuits. Release of the switch automatically returns the panel to its normal automatic position and operation.

The present apparatus embodies the two pumps 48 and 50 and has in connection therewith automatic alternation by means of the automatic alternator 68 which has in circuit therewith the load or driving circuits 70 and 70 respectively connected to relays K1 and K2 by lines B and C. In circuit with said pump alternator 68 is a switch 82 which has an over-riding capability to provide a selection of pump operating sequences, i.e., fixed or automatically alternating.

From a pumped down condition, the pump 48 is brought into operation when the liquid level rises to an upper predetermined or pre-set limit and when the level is pumped down to a predetermined or pre-set limit, the pump will turn off. The parameters are set by the contact elements. On a subsequent operating cycle, the lag pump 50 will commence to operate first. Thus the pumps automatically alternate their operating sequence when switch 82 is in automatic "auto position". If a liquid level continues to rise beyond the lead pump control element operating level, it may mean that the pump did not start or could not keep up with the rising level. A higher level contact element position for the lag pump is set for the lag pump to operate to either help or replace the lead pump, as the case may be. In this event the corresponding control element 50 will be operated and LED 7 will be lighted. Each pump will normally turn off when the level lowers to the level indicated by its OFF contact element.

If a pump is being operated manually or for some other reason the level is drawn down to the low elevation represented by switch pin 40a, the low (level) alarm 52 and LED 58 will be activated as well as the associated Alarm Annunciation Logic 80, Load Drivers 73 and 74, Relay K3 and the Alarm Circuit 85 activating the Alarm 55. When the cause of the low condition is removed, the level will rise with inflow to collection sump 26 and the alarm control elements will be restored to their normal condition by the signal increment lines 31 being energized to the level of the position of the contact element 42a.

Similar operation of the alarm circuitry takes place upon the occurrence of an abnormally high level condition as the High Alarm 54 and its LED 59 is activated by a high level condition and corresponding activation of the increment lines 31 to the level position of the contact element 46a. The high level condition is determined to have cleared when the level recedes to the elevation indicated by the contact element 44a.

The levels for the Alarm signals 52 and 54 may be optionally set by the High Alarm contact element being positioned just above the position of the lead pump ON Contact Element 32a and just below the Lag Pump ON contact element 36a so that the alarm will sound to alert the operator immediately if the Lead pump 48 is not able to handle a rising liquid level. An alarm control set to be energized just above the lead pump control level will alert the operator that the lead pump is clogged or otherwise inoperative even though the lag pump comes into later operation.

Said Fail Safe Alarm Logic by means of line D is in circuit with the terminal block 60 and by means of line E is connected with relay K3.

The Alarm Annunciation Logic 80 is fail safe in that relay K3 is held energized under normal operating conditions when power is present and the sensed level is within normal range. Upon the failure of the power source or any element of control, there is caused a transfer of the relay K3 contacts to the "alarm" state.

The Alarm Silence button switch 55a provides means for the attendant personnel to silence the alarm prior to a return to a level of normal operating range.

To revert back to the pump alternator 68, the same is connected with the sequence switch 82 which may be set manually to provide a pump 48–50 fixed sequence of automatic operation or a sequence of pump 50–48 automatic operation, or automatic transposition of the operating sequence of the pumps on successive operating cycles, the particular sequence being optional with the operator.

The LEDs 56–59 light up as their respective controls 49, 51, 52 and 54 are energized and in operation.

The panel 22 gives an easily read and easily comprehended total indication of the pumping operation and provides for testing. The panel will be brightly colored and all of the indicia is present on the face of the panel upon the opening of the panel door or may be seen through a transparent door.

The contact elements 32a–46a are easily positioned and repositioned to set operating parameters.

With reference to FIG. 1, it is noted that "feet" level increments of measure 30a are easily sighted across the width of the panel 22. A clear and total disclosure of operation is present in the display of said panel 22.

Though not here shown, electrical connections are made at a single multi-terminal, clamp barrier type of block positioned at the rear or said panel 22 carried by the housing 11 and here is indicated by the terminal block 60.

The panel taken as a whole has been extremely well received in the industry as a significant improvement over prior art structures as a comprehensive display of control information.

It will of course be understood that various changes may be made in form, details, arrangement and proportions of the product without departing from the scope of the invention which, generally stated, consists in a product capable of carrying out the objects above set forth, such as disclosed and defined in the appended claims.

What is claimed is:

1. In connection with an apparatus for sensing a liquid level within and disposing of liquid from a sump accumulator, a panel control structure embodying appropriate circuitry for its operation; having in combination a liquid level indicator having indicia indicating liquid levels in connection with a sump, a plurality of vertical control columns having spaced incremental contact receptacles corresponding to said indicia, signal-increment lines in connection with corresponding of said indicia and said contact receptacles, contact elements disposable into said receptacles engaging said increment lines and setting parameters of liquid levels, means reducing the level of liquid in said sump to an analog value and providing an analog signal, said signal increment lines each represent an increment of said analog signal and together represent the entire analog signal excursion, a pair of said control columns respectively being in circuit with a first and second pump, said contact elements being set into said receptacles at parameters of liquid levels at which said pumps are respectively predetermined to run and to stop, means automatically causing to become energized said increment lines which correspond to and are within the parameters of said liquid levels as sensed by said liquid level indicating indicia, means in connection with said control columns visually indicating that a pump control circuit is energized, one of said control columns has incremental contacts to energize a warning signal that an operating pump has not been deenergized when it otherwise should be stopped upon a predetermined low liquid level being indicated, and means energizing an alarm to indicate the malfunction of said warning signal.

2. In connection with an apparatus for sensing a liquid level within and disposing of liquid from a sump accumulator, a panel control structure embodying appropriate circuitry for its operation; having in combination a liquid level indicator having indicia indicating liquid levels in connection with a sump, a plurality of vertical control columns having spaced incremental contact receptacles corresponding to said indicia, signal-increment lines in connection with corresponding of said indicia and said contact receptacles, contact elements disposable into said receptacles engaging said increment lines and setting parameters of liquid levels, means reducing the level of liquid in said sump to an analog value and providing an analog signal, said signal increment lines each represent an increment of said analog signal and together represent the entire analog signal excursion, a pair of said control columns respectively being in circuit with a first and second pump, said contact elements being set into said receptacles at parameters of liquid levels at which said pumps are respectively predetermined to run and to stop, means automatically causing to become energized said increment lines which correspond to and are within the parameters of said liquid levels as sensed by said liquid level indicating indicia, means in connection with said control columns visually indicating that a pump control circuit is energized, one of said control columns has incremental contacts to energize a warning signal that with a pump indicated as being in operation, the liquid level indicator indicates a rising liquid level above a predetermined liquid level for the operation of said pump, and means energizing an alarm to indicate the malfunction of said warning signal.

3. In connection with an apparatus for sensing a liquid level within and disposing of liquid from a sump accumulator, a panel control structure embodying appropriate circuitry for its operation; having in combination a liquid level indicator having indicia indicating liquid levels in connection with a sump, a plurality of vertical control columns having spaced incremental contact receptacles corresonding to said indicia, signal-increment lines in connection with corresponding of said indicia and said contact receptacles, contact elements disposable into said receptacles engaging said increment lines and setting parameters of liquid levels, means reducing the level of liquid in said sump to an analog value and providing an analog signal, said signal increment lines each represent an increment of said analog signal and together represent the entire analog signal excursion, a pair of said control columns respectively being in circuit with a first and second pump, said contact elements being set into said receptacles at parameters of liquid levels at which said pumps are respectively predetermined to run and to stop, means automatically causing to become energized said increment lines which correspond to and are within the parameters of said liquid levels as sensed by said liquid level indicating indicia, means in connection with said control columns visually indicating that a pump control circuit is energized, and a power-on delay circuit which in case of a power failure, delays the return of power to the circuitry of apparatus for a predetermined interval of time.

* * * * *